United States Patent [19]
Herrmann

[11] Patent Number: 5,865,397
[45] Date of Patent: Feb. 2, 1999

[54] METHOD AND APPARATUS FOR CREATING DETAIL SURFACES ON COMPOSITE AIRCRAFT STRUCTURES

[75] Inventor: Richard Herrmann, Auburn, Wash.

[73] Assignee: The Boeing Company, Seattle, Wash.

[21] Appl. No.: 567,542

[22] Filed: Dec. 5, 1995

[51] Int. Cl.[6] .................................................. B64D 45/02
[52] U.S. Cl. ........................ 244/1 A; 244/121; 244/133; 361/218
[58] Field of Search .................................... 244/1 A, 121, 244/123, 133; 361/218

[56] References Cited

U.S. PATENT DOCUMENTS

| | | | |
|---|---|---|---|
| 3,058,704 | 10/1962 | Bergstedt | 244/133 X |
| 3,755,713 | 8/1973 | Paszkowski | 244/1 A X |
| 3,989,984 | 11/1976 | Amason et al. | 244/1 A X |
| 4,542,056 | 9/1985 | Anglin et al. | 244/133 X |
| 4,750,981 | 6/1988 | Dalland et al. | |
| 4,755,904 | 7/1988 | Brick | 244/1 A X |
| 4,882,016 | 11/1989 | Westerman, Jr. | |
| 4,988,414 | 1/1991 | Westerman, Jr. | |
| 5,250,342 | 10/1993 | Lang et al. | 361/218 X |
| 5,499,782 | 3/1996 | Domine | 244/1 A |

FOREIGN PATENT DOCUMENTS

90/01857  2/1990  WIPO ...................................... 361/218

Primary Examiner—William Grant
Attorney, Agent, or Firm—Christensen O'Connor Johnson & Kindness PLLC

[57] ABSTRACT

An aircraft surface for use on composite structure. The detail surface includes a conductive foil, a conductive double pulled expanded screen, and an adhesive for joining the conductive foil and screen to a composite material. The conductive screen is layered between the conductive foil and composite structure, providing electrical contact between the foil and the composite structure.

10 Claims, 8 Drawing Sheets

METHOD AND APPARATUS FOR CREATING DETAIL SURFACES ON COMPOSITE AIRCRAFT STRUCTURES

FIELD OF THE INVENTION

The present invention relates to aircraft detail surfaces in general and, in particular, to detail surfaces for use with composite aircraft structures.

BACKGROUND OF THE INVENTION

As part of a continuing effort to develop aircraft having increased fuel efficiency and decreased weight, many aircraft manufacturers are replacing structures made of aluminum or steel with structure made of composite materials. Composite materials typically have strengths which equal or exceed the strength of a corresponding steel or aluminum structure while weighing significantly less. In addition, composite materials are not as susceptible to corrosion, thereby adding to the life expectancy of the aircraft.

Composite materials achieve their light weight and high strength by the nature of their construction. A composite material is made of graphite fibers that are woven together to form a sheet. Each sheet is then bonded to another sheet forming a layer of a desired thickness. Generally, the fibers of each sheet are oriented in different directions from the fibers of the sheet above and below it. This produces a cross-hatch effect that creates a material much stronger than an individual composite sheet. An epoxy resin is used to bond all the sheets together.

Most aircraft have numerous systems that need to be secured to the aircraft's structure. These systems include fuel pumps, avionics, and many others. The systems are secured to the aircraft structure at points called "details". For composite structures, the details are metallic pads having a shape that generally matches the "footprint" of the system to be secured to the composite structure. The detail must provide a flat, smooth, hard surface at the point where the detail is to be secured in order to ensure a good seal between the system and the structure. In addition, the detail must also provide a good electrical conductive path between the system and the composite structure in order to safely conduct electrical current received in the case of a lightning strike.

During a lightning strike, a large current (up to 200KAmps) enters the aircraft at some point and propagates throughout the aircraft in an attempt to dissipate the electrical energy. One of the most dangerous points for the lightning current to cross is at a junction of dissimilar materials. This is particularly true at the system details where currents flow from the system housings, which are often metal, into the composite aircraft structures. If the conductivity at this junction is low, the large current can vaporize the epoxy resin in the composite material, creating a superheated gas that is expelled with explosive force from under the detail.

In the past, the only way to achieve good conductivity between a detail and a composite structure was to electroplate the detail onto the composite structure. To do this, the composite structure needed to be primed with a conductive paint and then surrounded with a chemical bath. Electric current was then applied to the bath causing a layer of metal to gradually build up on the layer of conductive paint. While the resulting detail did have good conductivity to the underlying composite structure, the process is slow and labor intensive. In addition, the resulting detail was easily peeled away from the composite structure when the system secured to the detail was removed for maintenance or repair. Repair of the detail requires another electroplating process, which is extremely dangerous in aircraft that had previously been fueled unless all fuel vapors have been removed, thereby adding to the cost and delay of repairing a detail.

Therefore, there is a need for a method of creating a detail on a composite aircraft that ensures good conductivity between a composite structure and an aircraft system. In addition, the detail should be strong enough to withstand removal of the system without peeling. Finally, the detail should be able to be repaired in the presence of flammable materials.

SUMMARY OF THE INVENTION

The present invention is a detail surface for use with composite structures in aircraft. The detail surface includes a conductive metallic foil, a conductive screen and an adhesive for bonding the foil and the screen to composite material. The conductive screen provides electrical contact between the composite's fiber ends and the conductive foil.

The detail surface can be mounted on fueled aircraft where the risk of explosion from sparks precludes the use of electroplating. In addition, the conductive nature of the detail also allows it to be used for any application where intimate electrical contact with a composite material is required.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is a method of creating detail surface on a composite structure in a manner that provides a smooth flat surface at which an aircraft system can be secured. The detail of the present invention provides a good electrical contact between the attached system and the composite structure.

Figure 1:
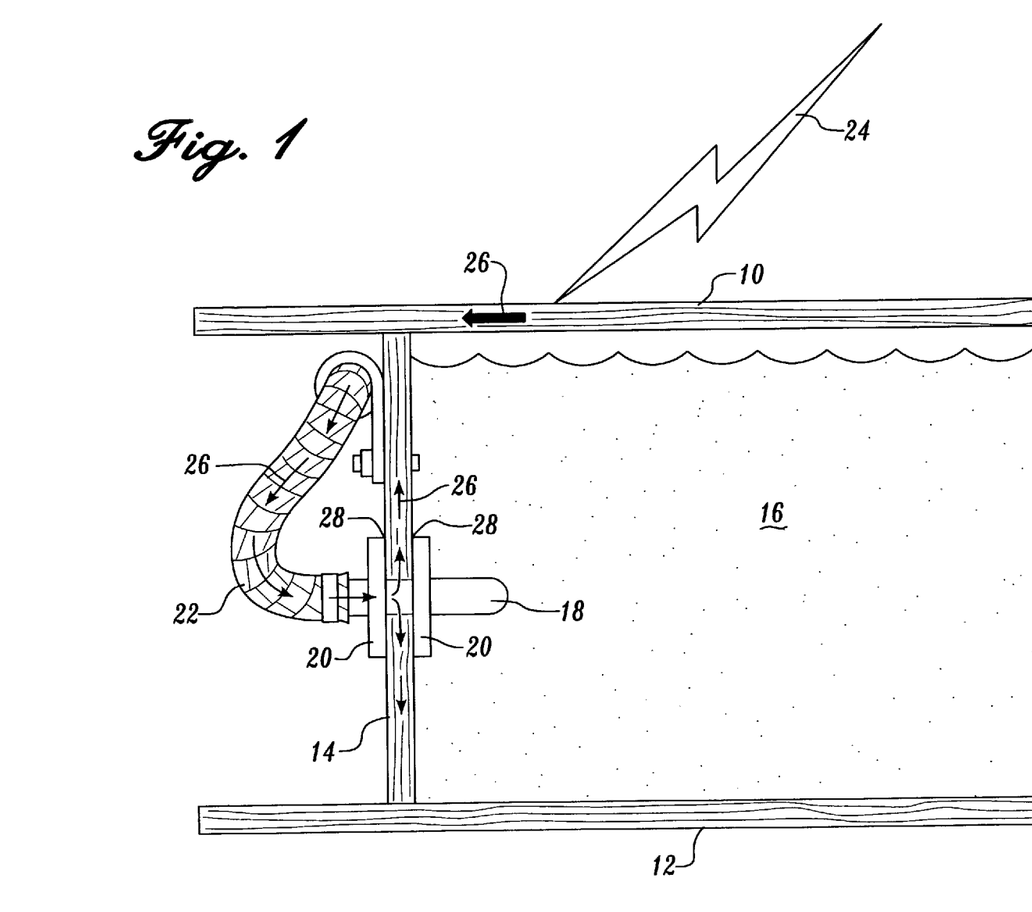
FIG. 1 is a partial cross-sectional view of an aircraft wing depicting the path of a lightning strike through a system and into a composite structure.

To illustrate a typical environment in which a detail according to the present invention is used, FIG. 1 shows a cross section of a composite aircraft wing. The wing has an upper surface 10 and a lower surface 12 with multiple spars 14 that join the upper surface 10 to the lower surface 12. The area between the spars 14, the upper surface 10, and the lower surface 12 form cells within the wing that are often used to store fuel 16. Because the pilot needs to have fuel level information at all times, a system 18 (in the present case, a fuel sensor) is installed in the spar 14 in order to detect the level of fuel in the cell. To install the fuel sensor 18, a hole is drilled through the composite spar 14 and the fuel sensor 18 is placed through the hole and bolted down on either side of the spar 14. Since the fuel sensor 18 protrudes through the spar, a tight seal must be maintained so that the fuel will not leak outside the cell. Generally, 0-rings (not shown) are fitted between the base of the fuel sensor 18 and the composite spar 14 to ensure a tight seal. The housing of the fuel sensor 18 has a base 20 having a shape or "footprint" that must be matched with a corresponding detail on the surfaces of the spar 14 to provide a tight seal and good electrical contact with the composite material of the spar 14.

The fuel sensor 18 is electrically connected to the rest of the aircraft fuel systems by wires that run through an overbraided conduit 22 on the non-fuel side of the spar 14. The purpose of the overbraiding is to carry any extraneous currents that the aircraft may encounter such as from a lightning strike. For example, a lightning strike 24 hitting the upper surface 10 of the wing will initiate a current 26 that will flow through the aircraft and seek out a path to an area of lower potential. The overbraiding provides a very low resistive path for the lightning current so the current 26 will typically travel down the overbraided conduit 22 and into the base 20 of the fuel sensor 18. From here, the current will flow into the composite spar 14, provided that the junction 28 between the composite and fuel sensor 18 is adequate to pass the lightning current without melting. Once the current enters into the spar, it will travel to the upper and lower surfaces 10, 12 of the wing. At this point, it is possible for the current to dissipate back into the atmosphere as lightning. If the lightning current 26 has a good conductive path, an observer from the ground would appear to see the lightning "pass through" the plane and continue to the ground below.

It should be noted that lightning strikes and the resultant currents are very unpredictable. Thus, it is possible for currents to travel from the composite and into the system housing. If this occurs, the overbraided conduit 22 would carry the lightning current 26 away from the composite spar 14. However, the direction of the current 26 does not affect the present invention.

As discussed above, the large amounts of current created by a lightning strike cause restive heating at the point where the current enters the composite structure. The heating can literally melt the composite material and vaporize it into an explosive gas. Thus, it is very important that the detail at which a system is secured to a composite structure provide a path of low resistance into the composite structure.

Figure 2:
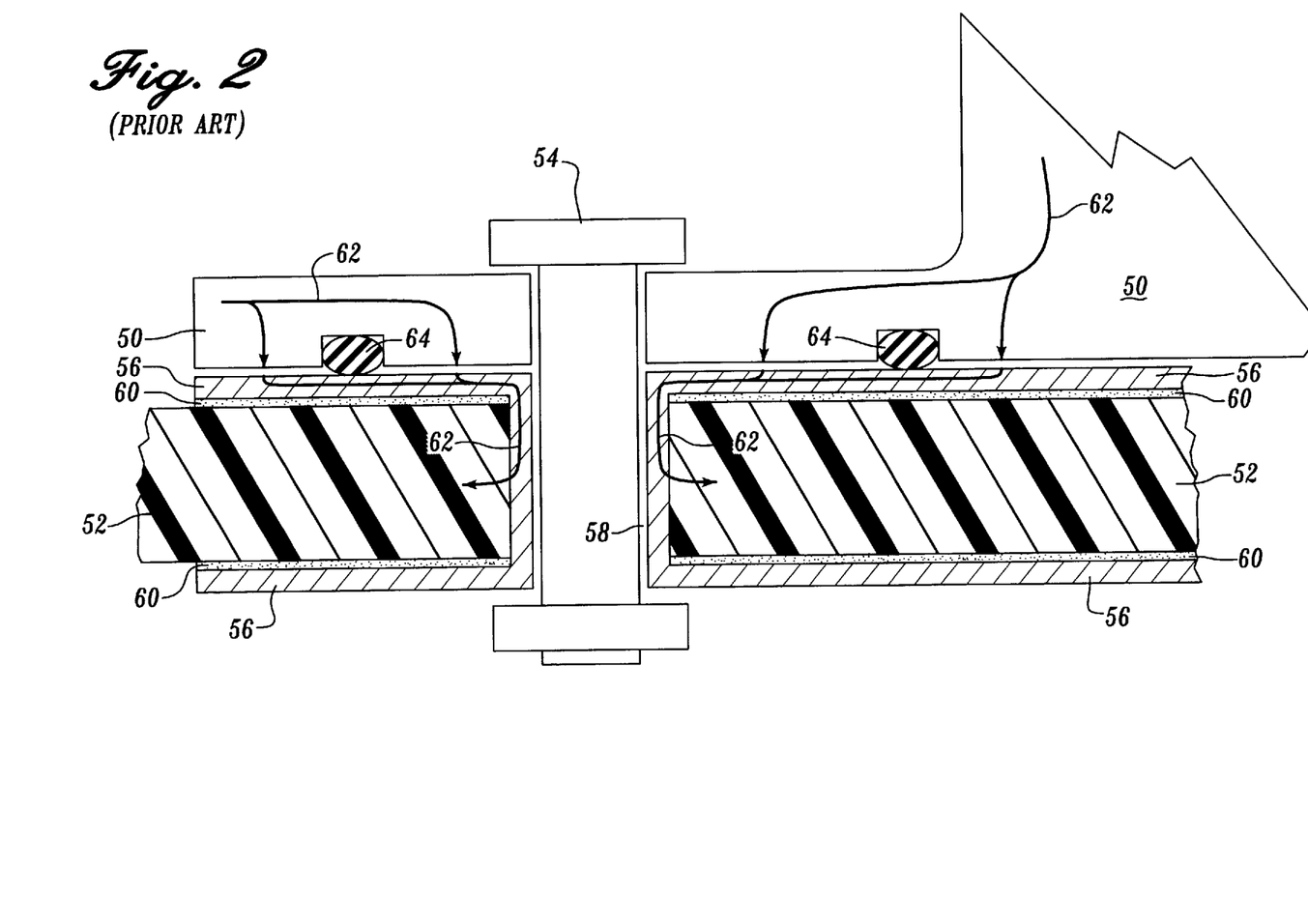
FIG. 2 is an enlarged cross-sectional view of a prior art electroplated detail showing the lightning current path from a system to a composite structure.

FIG. 2 is a cross-sectional view of a prior art method of securing a system 50 to a composite aircraft structure 52. The system 50 is secured to the composite structure 52 using a bolt 54. Between the system 50 and the composite structure is a detail 56. The detail 56 is formed by first drilling a hole 58 through the composite structure 52. Then, a layer of conductive paint 60 is sprayed on either side of the composite around the hole 58 but not on the inner surface of the hole 58. The conductive paint 60 is then sanded to form a smooth, flat surface upon which the detail 56 can be formed. The detail 56 is created by electroplating a layer of metal on both sides of the hole 58. It should be noted that the metal is in direct contact with the ends of the carbon fibers that extend into the hole 58 but is separated from the surface of the composite structure 52 by the layer of conductive paint 60. O-ring type seals 64 are used between the system 50 and the detail 56 when required to prevent fluid leakage.

When a lightning strike occurs, a current 62 flows through the housing of the system 50 to the electroplated detail 56. Because the conductivity of the conductive paint 60 is less than the conductivity of the electroplated detail 56, the majority of the current 62 will enter the composite structure 52 at the point where the electroplated detail 56 is in intimate contact with the composite fibers, i.e., in the center of the hole 58.

Although this electroplated detail 56, if manufactured properly, can reduce the damaging effects of a lightning strike current, it has a major drawback of not being very robust. It is often necessary to remove the system 50 from the detail 56 for repair or replacement. The electroplated detail 56 is easily damaged during this process. For example, when the system 50 is removed from the detail 56, it is possible that an air gap can form between the electroplated surface and the ends of the carbon fibers. This air gap increases the resistance between the detail 56 and the composite structure 52 thereby forcing more current 62 to flow where the detail is still in intimate contact with the composite material. In addition, the air gap creates potential for arcing when subjected to extremely large lightning currents, thereby creating a risk of explosion. Finally, the low adhesive strength of the conductive paint 60 may permit the electroplated detail 56 to peel off the composite structure as the system 50 is removed.

If the electroplated detail 56 is damaged, it normally is repaired by re-electroplating the surface of the composite structure 52. As discussed above, this is extremely dangerous in "wet" or fueled aircraft because of the possibility that a spark from the electroplating process may ignite the fuel vapors and cause an explosion. Therefore, the aircraft must be completely evacuated of fuel and personnel before the repair of a damaged detail can take place. In addition, because the two sides of the detail are connected by the electroplating that extends through the hole 58, it is not possible to repair one side of the detail without having to repair the other.

Figure 3:
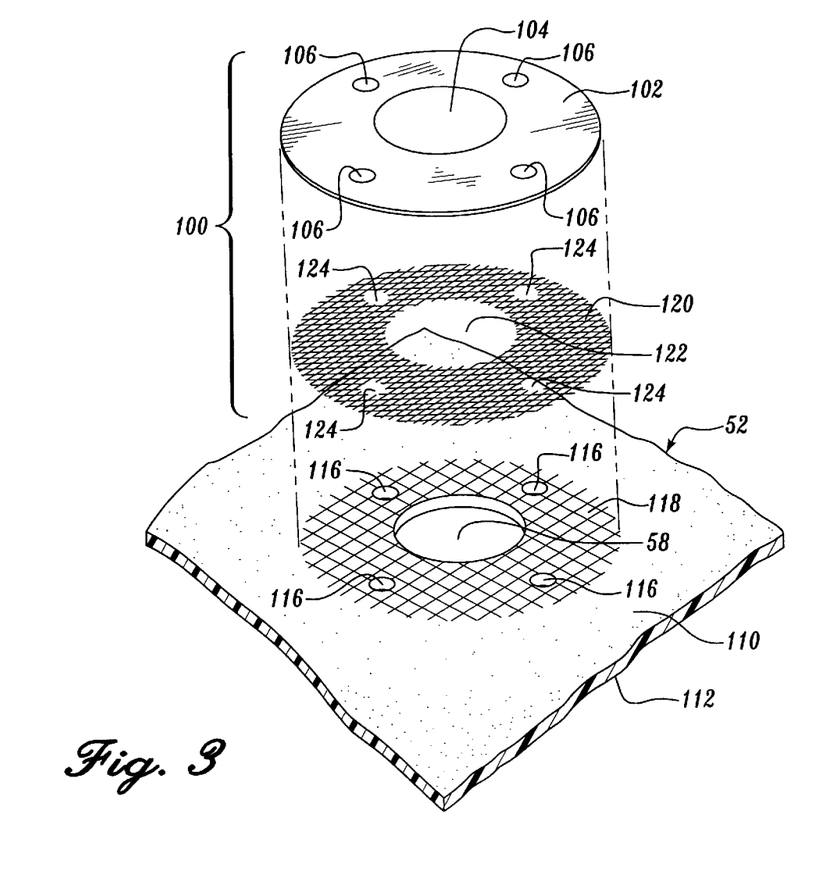
FIG. 3 is an exploded view of a conductive detail according to the present invention.

A detail 100 according to the present invention that eliminates the problems associated with the prior art electroplated details is shown in FIG. 3. The detail 100 comprises a conductive metallic foil 102 having a shape that is the same as the footprint of the system to be secured to a section of a composite structure 52. The foil 102 usually has a hole 104 to allow a system to pass through and several peripheral holes 106 for mounting a system to the composite structure 52. In the presently preferred embodiment of the invention, the foil 102 is made of copper with a thickness between 0.010 and 0.013 inches. The metallic foil 102 functions as a smooth conductive surface on which aircraft systems such as instrumentation, probes and the like can be mounted. As will be described in further detail below, the metallic foil 102 also functions as a non-deforming surface which allows proper O-ring sealing.

The composite structure 52 on which the detail 100 is placed has a top surface 110, a bottom surface 112, and a hole 58 to allow a system to pass through the structure. One or more peripheral holes 116 surround the hole 58 for mounting a system to the composite structure with bolts or other suitable fasteners. Between the composite structure 52 and the metallic foil 102 is a section of screen 120. The screen 120 is also conductive and is preferably made of copper. However, one skilled in the art will realize that other types of conductive metals may be substituted for the copper in both the metallic foil 102 and the screen 120 with satisfactory results.

The screen 120 has a hole 122 disposed at its center to allow a system to pass through and one or more peripheral holes 124 through which the bolts for mounting the system are passed. The screen 120 makes intimate contact with the foil 102 and the top surface 110 of the composite 52. As will be described below, the screen 120 provides a superior electrical contact between the foil 102 and the composite top surface 110 than if the foil 102 alone is applied directly to the composite top surface 110.

The screen 120 and the metallic foil 102 are secured to the top surface 110 of the composite structure 52 with an epoxy adhesive. In addition to bonding the screen 120 and the metallic foil 102 to the composite top surface 110, the adhesive functions to smooth out the inherent unevenness of the composite top surface 110, thereby eliminating the need for any type of smoothing paint applied to the composite top surface 110.

The adhesive used to secure the metallic foil 102 and screen 120 to the surface of the composite must enable the detail surface to resist damage during system installation and removal and also to help direct current to the composite top surface 110 during a lightning strike. To meet these requirements, a flexible, dielectric adhesive is recommended. The presently preferred adhesive for bonding the foil and the screen to the composite surface is a dielectric flexible epoxy such as EC 2216 or BMS 5-92 manufactured by 3M of Minneapolis, Minn. This type of epoxy produces a very high peel strength and a superior resistance to cracking when the underlying composite material flexes. In addition, the dielectric properties of the adhesive help direct the current path of a lightning strike into the composite structure 52. The adhesive surrounds all sides of the screen 120, except where the screen 120 contacts the composite top surface 110 and the foil 102. By containing the lightning current in the screen 120, any potential outward sparking or arcing, such as between the strands of the screen 120, is minimized.

To apply a conductive detail 100 to a composite structure, the foil 102 and composite top surface 110 are prepared as follows. First, the foil 102 is prepared for bonding by sanding one surface using the "jitterbug" sanding method. This method provides thousands of small swirl-shaped serrations in the foil surface. To obtain the optimum surface bonding condition, multiple step abrasive sanding is recommended, beginning with a cleansing pad such as aluminum oxide SCOTCHBRITE® followed by a 280 to 320 grit abrasive paper and finished with a 100 to 150 grit abrasive paper. This method provides better "tooth" points than chemical etching or sandblasting.

Preparation of the composite top surface 110 requires creating an abraded area 118 having a dimension that is the same size as the metallic foil 102 to be applied. This abrasion of the composite top surface 110 increases the number of graphite fiber ends protruding from the composite top surface 110. Any number of different abrading methods can be used so long as the layer of epoxy on the surface of the composite is removed to the point that the graphite fibers begin to show.

Figure 4A:
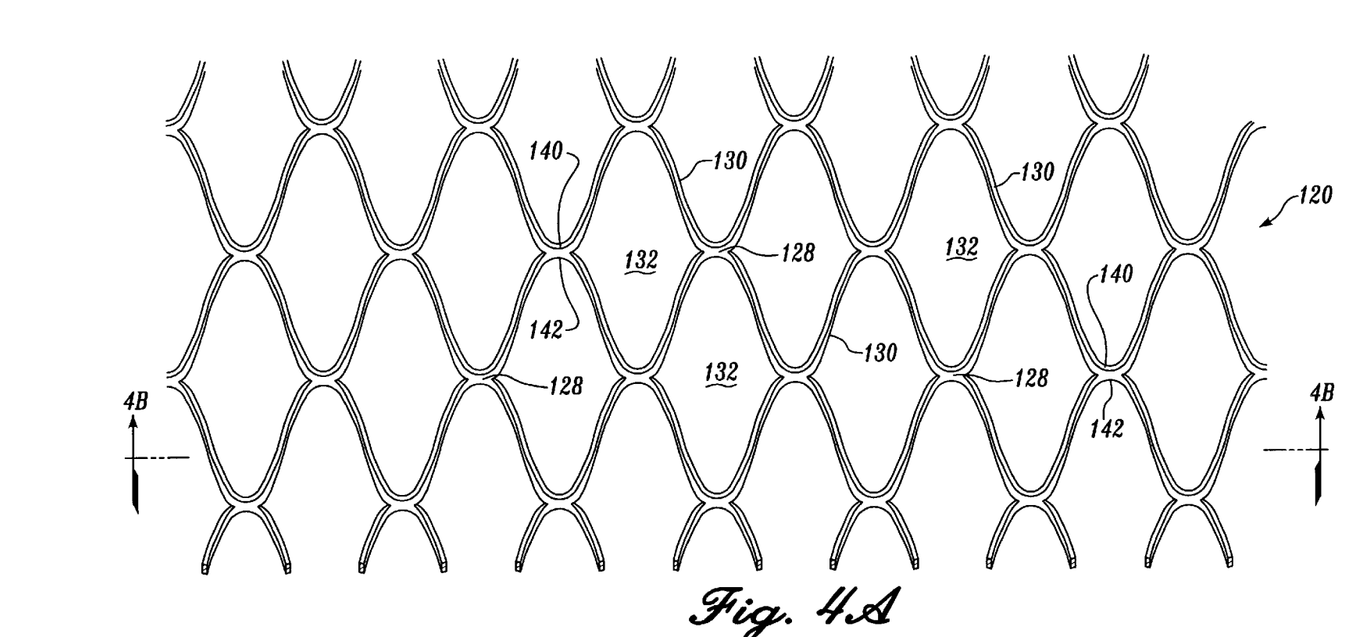
FIG. 4A is a top view of a double pull expanded screen used in the conductive detail of the present invention.
Figure 4B:
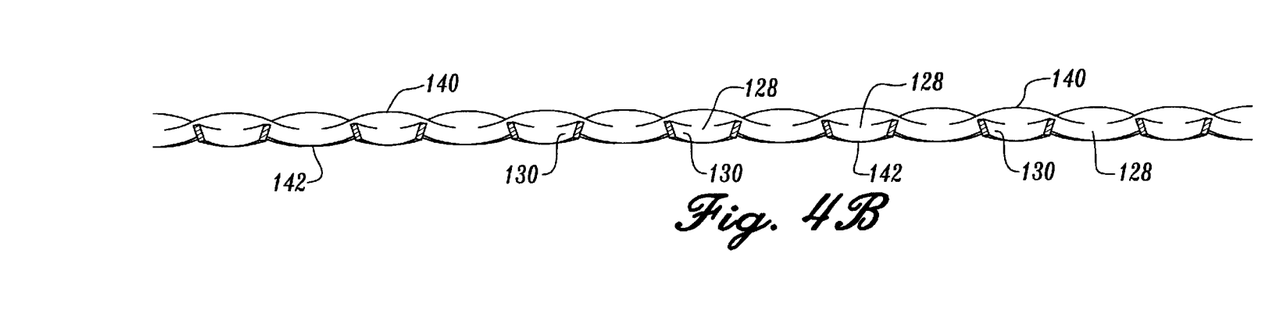
FIG. 4B is a cross-sectional view of a double pull expanded screen shown in FIG. 4A.

In order to provide adequate contact between the metallic foil 102 and the abraded composite surface 118, the screen 120 must be able to withstand a compression force applied to the foil 102 during installation of the detail 100. If a woven screen is used, the compression force can crush the screen so that the number of contact points between the metallic foil 102 and the composite surface 110 is reduced. Thus, the presently preferred screen is a double pull expanded screen 120 as shown in FIGS. 4A and 4B. The double pull expanded screen 120 used in the detail 100 of the present invention is manufactured by slitting a copper sheet in alternating parallel rows and pulling the sheet apart in two directions to expand the sheet into a screen 120. The expanded screen 120 comprises a pattern of interconnecting strands 130 that define a number of holes 132.

The unique characteristic of the double pull expanded screen 120 is that its strand joints 128 lie in an orientation that is generally perpendicular to a top surface 140 and a bottom surface 142 of the screen 120. As the copper sheet is pulled, the material between the slits become the strands 130 of the screen 120 and the material between the alternating rows that is not slit becomes the joints 128 or point where the strands 130 connect together. As can be seen in FIG. 4B, the more the screen is pulled, the more the joints 128 and strands 130 rotate to a position that is perpendicular to the planes of the top and bottom surfaces 140, 142.

Because the joints 128 and strands 130 are oriented at roughly 90° to the top and bottom surfaces of the screen, the screen is able to withstand a greater compression force without collapsing. The ability to withstand higher compression forces ensures that the screen will provide a good electrical conduit between composite surfaces 110 and the foil 102. In the presently preferred embodiment of the invention, the double pulled screen 120 is available as 7 CU 3/0 DDB from Ex-Met Corporation of Naugatuck, Conn. The "7" designates the material thickness (0.007 inches), the "CU" designates the material type (copper), the "3/0" designates the hole opening size and the "DDB" designates the direction of the material strand orientation.

Figure 5:
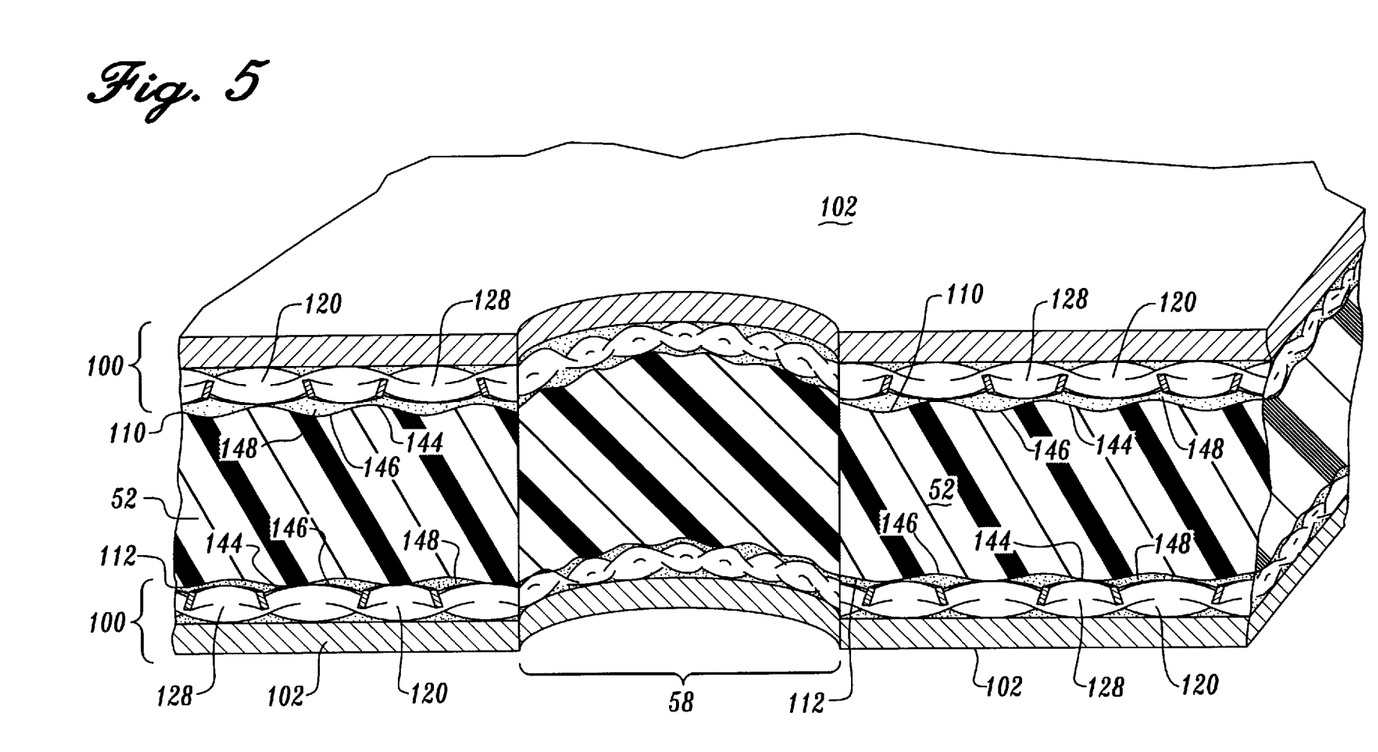
FIG. 5 is an enlarged cross-sectional view of the conductive detail of the present invention depicting the smoothing function of the expanded screen when applied to a tough composite surface.

FIG. 5 is a cross-sectional view of a conductive detail 100 of the present invention installed on two sides of a composite structure 52 with a system hole 58 drilled through it. As discussed above, the detail 100 comprises a metallic foil 102 and a double pull expanded screen 120 that are adhesively secured to the top and bottom surfaces 110, 112 of the composite structure 52. As will be appreciated, the surfaces 110, 112 of the composite structure are not perfectly smooth, but instead include a number of peaks 144 and valleys 146. If the metallic foil 102 was to be bonded directly to the surfaces 110, 112 of the composite structure 52, the foil 102 would conform to the rough surface of the composite 52 and would, therefore, be incapable of forming a tight seal with a system that is attached to the detail 100.

The screen 120 acts in conjunction with an adhesive 148 to fill in the valleys 146 in the surfaces 110, 112 of the composite structure 52 so that the metallic foil 102 is flat when secured to the composite surfaces 110, 112. In addition, because the joints 128 of the screen 120 are oriented at 90° to the surfaces of the metallic foil 102 and the composite surfaces 110, 112, the screen 120 is able to withstand the force of attaching a system to the composite structure without crushing.

Figure 6:
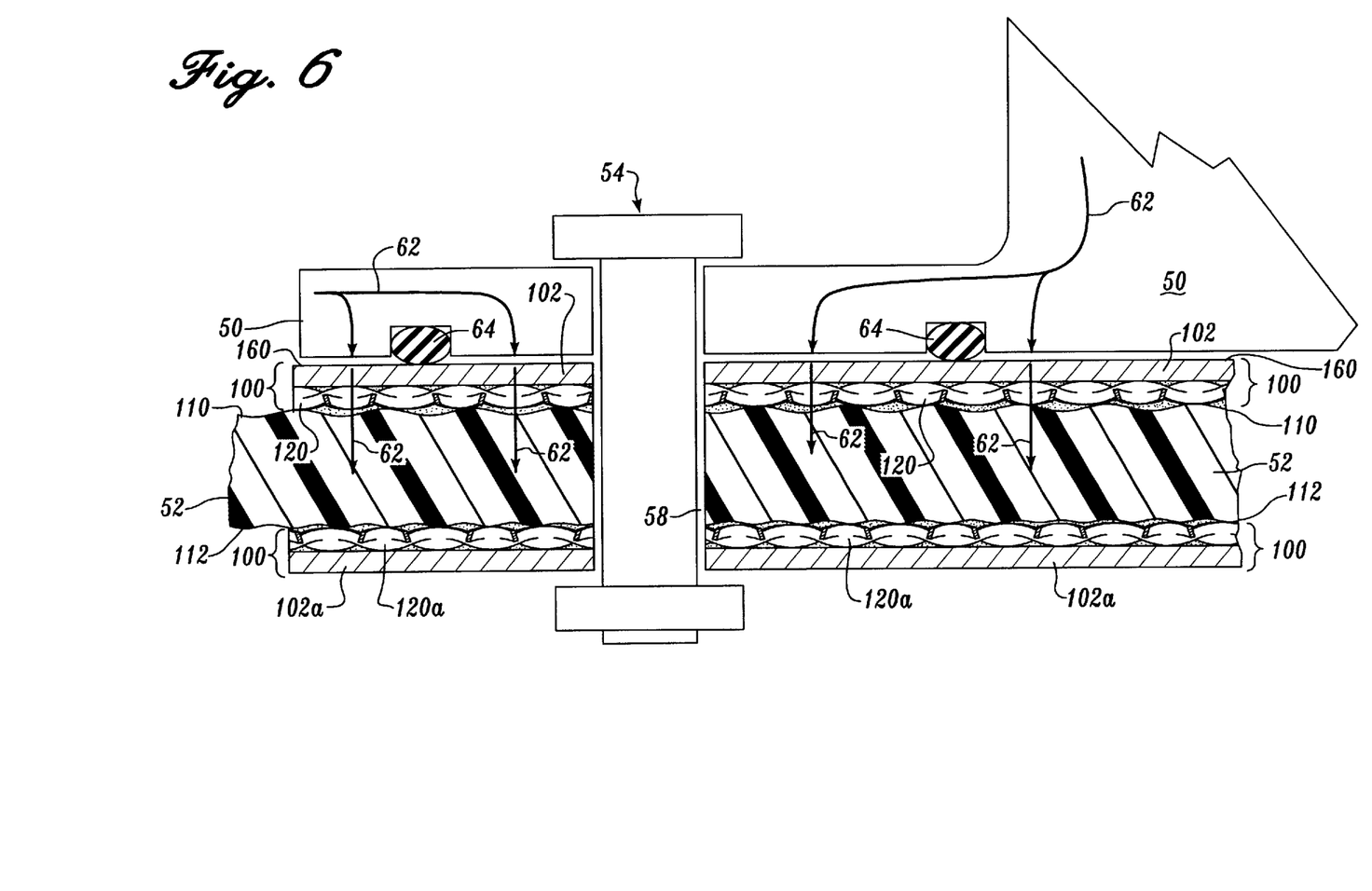
FIG. 6 shows the lightning current path from a system to a composite structure through the conductive detail of the present invention.

FIG. 6 illustrates how a current 62 from a lightning strike is passed from a system 50, through a detail 100 of the present invention and into a composite structure 52. The system 50 is in intimate contact, both physically and electrically, with a top surface 160 of the metallic foil 102. The lightning current 62 flows from the system 50, through the metallic foil 102 and through the screen 120 to the composite structure 52. Once the current 62 is in the composite structure 52, it can dissipate through the composite to a point of lower potential. Because the detail 100 of the present invention is directly connected to a greater surface area of the composite material 52, it has the ability to dissipate greater electrical current than details formed by the prior art electroplating method.

Unlike the old electroplating method, the inner surface of hole 58 is not sprayed with any type of conductive paint. Thus, the two foils 102, 102a on each side of the composite are not electrically connected through the hole 58.

Figure 7:
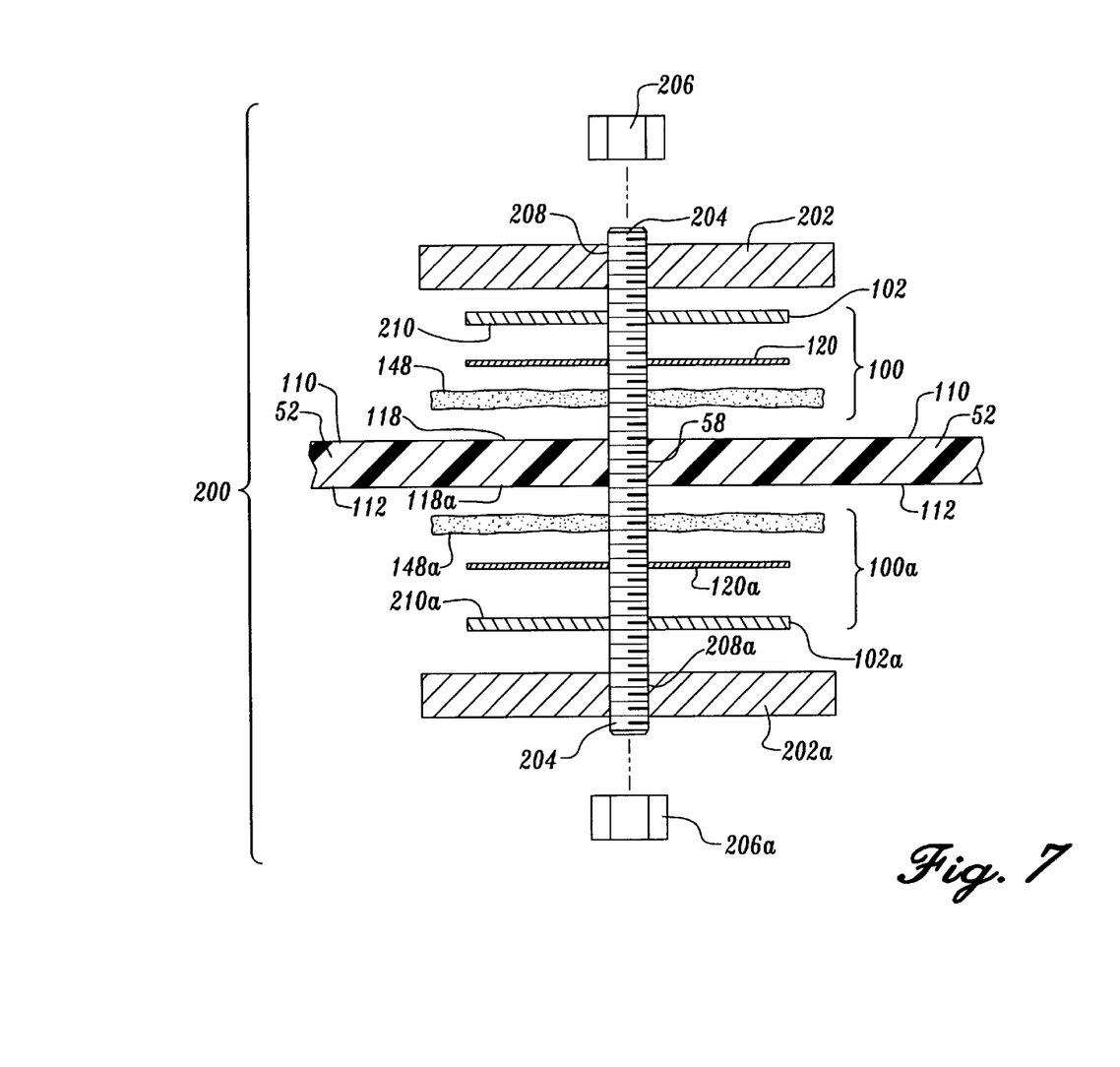
FIG. 7 is an exploded view of a jig for applying a conductive detail to a composite structure according to another aspect of the present invention.

FIG. 7 illustrates a jig 200 used to apply the conductive detail 100 of the present invention to the top and bottom surfaces 110, 112 of a composite structure 52. The jig 200 includes a pair of clamping blocks 202, 202a that are held together in compression with a bolt 204 and a pair of nuts 206, 206a. The nuts can be adjusted to increase pressure on the two clamping blocks 202, 202a. The clamping blocks 202, 202a have holes 208, 208a for allowing the bolt 204 to pass through in order to secure the details 100, 100a to the composite surfaces 110, 112.

To secure the details to the composite structure 52, the surfaces 110, 112 are abraded forming the abraded areas 118, 118a. An amount of epoxy adhesive 148, 148a is also applied to a sanded surface 210, 210a of two foils 102, 102a respectively. A nut 206 is then attached to the one end of the bolt 204 and a clamping block 202 is slid over the bolt 204. Then the foil 102 with adhesive 148 on its sanded surface 210 and a screen 120 are placed over the bolt 204. The bolt 204 is then placed through the hole 58 in the composite structure 52 and a second screen 120a and foil 102a are placed over the bolt 204. The second clamping block 202a is then slid over the bolt 204 and a second nut 206a is then placed on the end of the bolt 204. The nuts 206, 206a are then tightened and any excess adhesive 148, 148a that has squeezed out from under the clamping blocks 202, 202a is wiped away. The jig 200 is then left for a period of time so that the adhesive that secures the detail to the composite structure can cure. The preferred torque requirements on the nuts 206, 206a in order to achieve optimal surface contact, without crushing the underlying expanded screens 120, 120a, is 36 to 120 inch pounds or 3 to 10 foot pounds, depending on the size of the surface area that is being compressed. Single sided installations or repairs are accomplished in the same fashion only without the second set of foil 102a, screen 120a and adhesive 148a.

To ensure non-adherence of the epoxy to the clamping blocks 202, 202a and to the bolt 204, a non-stick synthetic material such as DELRIN™ is used to manufacture the bolt 204 and the clamping blocks 202, 202a. Aluminum, coated with a release agent or a permanent coating of Teflon® type synthetic resin, would also be acceptable.

As will be appreciated, the detail of the present invention has numerous benefits over the prior art electroplated detail. Although it is simple and inexpensive to manufacture, it provides superior electrical current capacity, easy installation, and can be repaired on a fueled aircraft. To repair a damaged detail, it is only necessary to sand off the old detail and then glue and clamp the new detail in place. Individual repair of each side of the detail is also possible because the sides are not electrically connected like the prior art electroplated detail.

One skilled in the art will also recognize that this type of detail surface lends itself to a variety of uses. In addition to protection from lightning strikes, the detail provides protection from electromagnetic interference (EMI) and electromagnetic pulses (EMP).

Figure 8A:
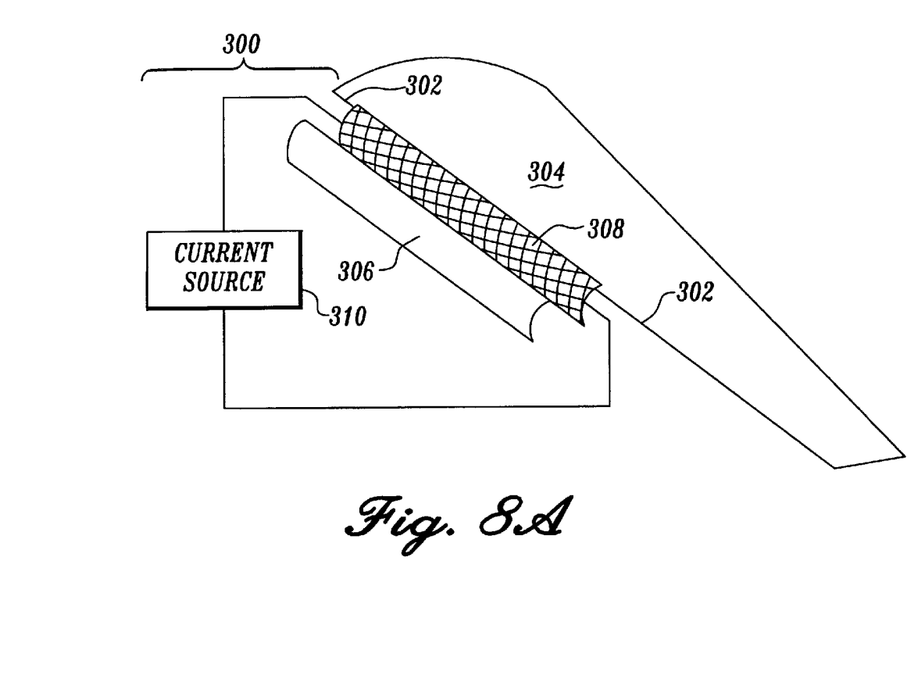
FIG. 8A is an exploded view of an alternative embodiment of the present invention as used on a leading edge of an aircraft wing.
Figure 8B:
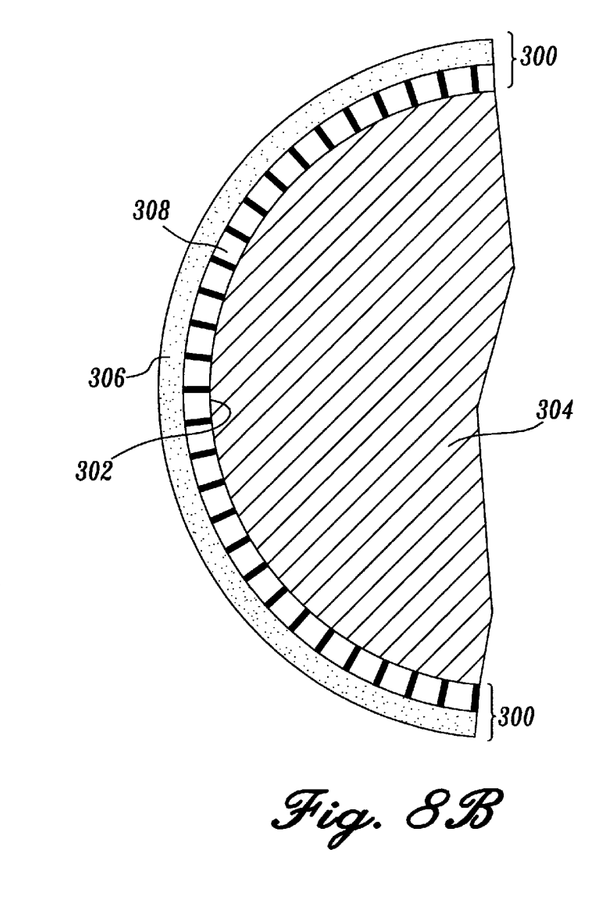
FIG. 8B is a cross-sectional view of the alternative embodiment as shown in FIG. 8A.

Another embodiment of the invention, as shown in FIG. 8A, is a heating or "thermal barrier" device 300 that is used to de-ice a leading edge 302 of an aircraft wing 304. In this embodiment, a metallic foil 306 and screen 308 are adhered to the leading edge 302 of the wing 304 as shown in cross-sectional view, FIG. 8B. A current source 310 is connected to the metallic screen 308 to pass electrical current through the screen, thereby creating resistive heating. The metallic foil 306, which is in intimate contact with the screen 308, transfers the heat from the screen 308 to any ice formed on the leading edge 302 of the aircraft wing 304, in order to melt the ice and prevent any further icing. The thermal barrier also provides a good electrical coupling into the aircraft wing in the case of a lightning strike.

While the preferred embodiment of the invention has been illustrated and described, it will be appreciated that various changes can be made therein without departing from the spirit and scope of the invention. Therefore, the scope of the invention is to be determined solely from the following claims.

The embodiments of the invention in which an exclusive property or privilege is claimed are defined as follows:

1. An aircraft detail service for use on a composite structure comprising:

a conductive foil having a top surface and a bottom surface;

a conductive screen having a top surface, a bottom surface, and a plurality of holes, the top surface making intimate contact with the conductive foil bottom surface and the bottom surface making intimate contact with composite structure such that a conductive path is created between the conductive foil and the composite structure, the conductive path having an area substantially equal to the area of the conductive screen; and an adhesive for joining the conductive foil and the conductive screen to the composite structure.

2. The aircraft detail surface as claimed in claim 1, wherein the adhesive is nonconducting.

3. The aircraft detail surface as claimed in claim 1, wherein the adhesive is flexible.

4. The aircraft detail surface as claimed in claim 1, wherein the conductive foil is copper.

5. The aircraft detail surface as claimed in claim 1, wherein the conductive screen is copper.

6. The aircraft detail surface as claimed in claim 1, wherein the conductive screen is a double pull expanded screen.

7. The aircraft detail surface as claimed in claim 6, wherein the conductive screen is a double pull expanded screen having joints perpendicular to the conductive screen top and bottom surface.

8. A method for installing an aircraft detail surface on a composite structure comprising the steps of:

abrading an area of the composite structure to expose composite material fiber ends;

applying adhesive to the composite material surface;

applying a conductive screen having a top surface, a bottom surface, and a plurality of holes such that the bottom surface makes intimate contact with the composite material fiber ends exposed during abrading; ;and applying conductive foil onto the conductive screen top surface with sufficient pressure such that the conductive foil makes contact with the conductive screen top surface such that a conductive path is created between the conductive foil and the composite structure, the conductive path having an area substantially equal to the area of the conductive screen.

9. The method of claim 8, wherein the conductive screen is a double pull expanded screen.

10. The method of claim 9, wherein the conductive screen is a double pull expanded screen having joints that are oriented in a direction that is substantially perpendicular to the top and bottom surfaces of the conductive screen.

* * * * *

UNITED STATES PATENT AND TRADEMARK OFFICE
CERTIFICATE OF CORRECTION

PATENT NO. : 5,865,397
DATED : February 2, 1999
INVENTOR(S) : R. Herrmann

It is certified that error appears in the above-indentified patent and that said Letters Patent is hereby corrected as shown below:

On the title page, item [57]:

| | | |
|---|---|---|
| [57] | Abstract line 1 of text | After "aircraft" insert --detail-- |
| [57] | Abstract line 1 of text | "structure." should read --structures.-- |
| 8 (Claim 7, | 62 line 4) | "surface." should read --surfaces.-- |
| 9 (Claim 8, | 5 line 10) | ";and" should read --and-- |

Signed and Sealed this

Twenty-eighth Day of September, 1999

Attest:

Q. TODD DICKINSON

Attesting Officer     Acting Commissioner of Patents and Trademarks